(12) United States Patent
Helot et al.

(10) Patent No.: US 6,501,847 B2
(45) Date of Patent: Dec. 31, 2002

(54) SYSTEM FOR PROMOTING CORRECT FINGER PLACEMENT IN A FINGERPRINT READER

(75) Inventors: Jacques H. Helot, San Mateo, CA (US); Michael D. Derocher, Corvallis, OR (US)

(73) Assignee: Hewlett-Packard Comopany, Palo Alto, CA (US)

( * ) Notice: Subject to any disclaimer, the term of this patent is extended or adjusted under 35 U.S.C. 154(b) by 0 days.

(21) Appl. No.: 10/163,445

(22) Filed: Jun. 5, 2002

(65) Prior Publication Data

US 2002/0154796 A1 Oct. 24, 2002

Related U.S. Application Data

(62) Division of application No. 09/351,661, filed on Jul. 13, 1999.

(51) Int. Cl.[7] ................................................ G06K 9/20
(52) U.S. Cl. ...................................... 382/126; 382/312
(58) Field of Search ........................ 382/115, 124–127, 382/312, 315; 118/31.5; 283/68–70; 340/5.53, 5.83; 356/71; 396/15; 707/6, 9; 713/186; 902/3, 6; 421/1

(56) References Cited

U.S. PATENT DOCUMENTS

| | | | |
|---|---|---|---|
| 3,804,524 A | 4/1974 | Jocoy et al. ................. 356/138 |
| 4,246,568 A | 1/1981 | Peterson ............... 340/146.3 E |
| 4,553,837 A | 11/1985 | Marcus ......................... 356/71 |
| 5,177,802 A | * 1/1993 | Fujimoto et al. ............... 382/4 |
| 5,233,404 A | * 8/1993 | Lougheed et al. ............. 356/71 |
| 5,942,761 A | 8/1999 | Tuli ............................. 250/556 |
| 6,064,753 A | 5/2000 | Bolle et al. .................. 382/125 |
| 6,178,255 B1 | * 1/2001 | Scott et al. .................. 382/124 |
| 6,298,541 B1 | 10/2001 | Newby et al. ................. 29/458 |

* cited by examiner

Primary Examiner—Brian Werner

(57) ABSTRACT

A fingerprint reading system includes a guide mechanism that defines the path of a finger across an interrogation region defined by an imaging device and includes a locking mechanism that selectively restricts the guide mechanism. In one embodiment, the guide mechanism is a finger guide that is restricted from following its established slide path, unless there is an applied force in the direction generally perpendicular to the slide path. The finger guide includes a finger-supporting region with an opening configured to expose the finger to the imaging device. Following a fingerprint reading operation, the finger guide is returned to a rest position by at least one spring mechanism. Preferably, the locking mechanism is configured to require pressure on opposite sides of the finger guide, with the opposite sides being aligned with the slide path. This alignment is intended to provide proper finger placement, since it requires finger contact at both the forward and rearward sides of the finger-supporting region. In another embodiment, the guide mechanism is a pair of rollers that are restricted from rotation by at least one locking mechanism having a release member. The rollers are on the forward and rearward sides of an imaging window, while the release members are on the lateral sides, but are sufficiently close to the rollers that a single finger is in contact with the rollers and the release members during a fingerprint reading operation. The release members are depressable actuators that restrict roller rotation when the release members are in a relaxed condition.

6 Claims, 7 Drawing Sheets

SYSTEM FOR PROMOTING CORRECT FINGER PLACEMENT IN A FINGERPRINT READER

CROSS REFERENCE TO RELATED APPLICATION(S)

This is a divisional of copending application Ser. No. 09/351,661 filed on Jul. 13, 1999 which is hereby incorporated by reference herein.

TECHNICAL FIELD

The invention relates generally to fingerprint readers and more particularly to systems for properly positioning a finger for imaging by a stationary camera or other imaging device.

BACKGROUND ART

Passwords and personal identification numbers (PINs) have been used to provide security for financial transactions or to limit data accessibility. As one example, a person may be required to provide a PIN prior to a bank withdrawal from an automatic teller machine (ATM). As another example, access to a computer may require?a user to input a particular password. A concern is that passwords and PINs may be freely used by others who legally or illegally gain access to the passwords or PINs. Another concern is that passwords and PINs are sometimes forgotten, leaving a person unable to engage in an authorized transaction or unable to gain authorized access to data.

Biometrics may be used as a supplement or a substitute for providing security by means of passwords and PINS. Biometric-based security relates to verifying a person's identity by means of human features. The features may be facial features, such as the relative positions of eyes. Voiceprints may also be used to verify a person's identity. Fingerprints provide perhaps the most reliable biometric identification. An advantage of biometric identification is that the physical characteristics of a person cannot be taken by another.

The implementation of fingerprint security involves a number of alternatives. The image information that is stored and used as a reference may be a direct mapping of all of the physical characteristics of a finger. On the other hand, additional security is provided by converting the direct image information into a map of minutiae points that represent irregularities within the fingerprint. In this implementation, only the minutiae points are stored, rather than the actual fingerprint. Authorization to engage in a transaction or to gain access to protected data then requires a person to hold a finger to a reader, which provides the image information used to create a second map of minutiae points that is compared to the reference map.

Another difference among fingerprint readers relates to whether the finger is flattened or the Henry roll technique is used. The Henry roll technique is similar to that used in law enforcement to obtain a wider area of information than is obtained when the finger is flattened.

Yet another difference among fingerprint readers relates to the equipment for acquiring the fingerprint information. An imaging device may be sufficiently large to allow both the imaging device and the finger to remain stationary. The imaging device may be a charge coupled device (CCD) or an array of tiny capacitive sensors which capture the fingerprint information by measuring the differences in electrical charges between fields and ridges of the skin. However, the size of the array must be relatively large if the array and the finger are to remain in fixed positions. This may be cost prohibitive in many applications of biometric security. Consequently, many fingerprint readers require relative movement between imaging device and the finger to be imaged.

U.S. Pat. No. 4,553,837 to Marcus describes a Henry roll fingerprint processing apparatus that requires relative movement between the finger and the imaging hardware. The apparatus includes optical scanning equipment, an array of photoelectric transducers, lenses, and electrical scanning equipment. A cylindrical-segment platen provides a transparent surface for supporting a finger. A motor rotates the light source, the array, the lenses and an element of the electrical scanning equipment. The axis of rotation is substantially the same as the axis of the finger-supporting surface of the platen. As the rotation occurs, the physical characteristics of the finger modulate the light beam to provide a reflected light beam having the desired fingerprint information.

It is important that the finger remain properly positioned relative to the imaging equipment. Typically, the desired orientation is one in which the finger is generally parallel to an imaging plane. The curvature of the finger-supporting surface of the Marcus apparatus is designed to promote proper placement of the finger to be imaged. Another apparatus of interest is described in U.S. Pat. No. 3,804,524 to Jocoy et al. The Jocoy et al. apparatus directs and positions a finger for fingerprint identification. The finger is placed so as to abut a forward stop member. As the finger pushes the abutted forward stop member, the finger slides along the surface of a flat window. An imaging device is on a side of the window opposite to the finger. Lateral movement of the finger is retarded by providing a guide member that is straddled by two fingers as the hand is moved along the surface of the apparatus. The desired flatness of the finger (i.e., a generally parallel relationship between the finger and the imaging plane) is achieved by providing a palm guide member that is allowed to move in the direction of hand movement. In operation, the palm of the person is placed in contact with the palm guide member such that two fingers straddle the lateral guide member. As the stop member is pushed from covering the window, the fingerprint information is acquired.

While the prior art techniques for promoting proper finger positioning improve the likelihood that sufficient fingerprint information will be acquired, further improvements are desired. For example, in the Jocoy et al. apparatus, the device may easily be operated with the hand being cupped. The cup-shaped hand will still contact the palm guide member and will allow the person's finger to push the stop member from atop the window. However, the finger will be pointed toward the window as the finger travels over the imaging device. This adversely affects the likelihood that reliable fingerprint information will be acquired.

What is needed is a system that provides an increased reliability with respect to acquiring fingerprint information, with the increase being achieved as a consequence of promoting finger flatness during an imaging process.

SUMMARY OF THE INVENTION

A system for imaging a fingerprint includes providing a sliding finger guide that is restricted from following its established slide path, unless there is an applied force in the direction generally perpendicular to the slide path. The finger guide includes a finger-support region with an opening configured to expose a finger to an imaging device having a field of view that defines an interrogation region. In a preferred embodiment, the mechanism for restricting displacement of the finger guide is arranged to require pressure on opposite sides of the finger guide, with the opposite sides being aligned with the slide path. This alignment is intended to promote proper finger placement, since it requires finger contact at both the forward and rearward sides of the finger-supporting region.

In one embodiment, the finger guide is a carriage that is restricted from movement by a detent-and-notch arrangement in which at least one spring mechanism biases the finger guide into a locked position. In the locked position, detents rest in notches, so as to prevent sliding motion of the finger guide. However, by applying downward pressure onto the finger-supporting region of the guide, the detents are removed from the notches, allowing the guide to slide along a path that traverses the interrogation region of the imaging device. Typically, the imaging device is an optical arrangement, but this is not critical to the invention.

Preferably, the finger-support region has a central opening and has a contour designed to receive the finger to be imaged. For example, the contour may be the bottom portion of an elongated and truncated hemisphere. That is, the region may be cup-shaped, with an oval cross section that decreases in area as the cross section moves downwardly. Another preferred aspect of the finger guide is the use of raised bumps on the finger-support region in order to provide tactile feedback regarding finger positioning. For example, the-raised bumps may be on the forward and rearward sides of the finger-support region. Other tactile-feedback features may also be used.

In one embodiment, actuators extend from the surface of the finger-support region. Proper placement of a finger depresses the actuators and releases the finger guide for movement along its slide path. The actuators may be placed on the forward and rearward sides of the finger-support region, so that there is a strong likelihood that a finger is properly positioned when the guide is released from its locked position.

In another embodiment, proper finger positioning is promoted by using at least one roller that is locked unless certain conditions are met. For example, there may be a first roller on the forward side of an imaging window and a second roller on the rearward side of the imaging window, with the rollers being prevented from rotating unless pressure is applied to release members on the opposed lateral sides of the imaging window. The release members, rollers and imaging window should be sufficiently close to allow a single finger to contact all five components simultaneously. Consequently, when the finger is properly positioned, the two release members are depressed and the two rollers are allowed to rotate. In one application of this embodiment, the release members control the positions of projections which are aligned with teeth of gears at the ends of the rollers. Without pressure on the release members, the projections extend into the teeth and prevent gear rotation. However, when the release members are depressed, the projections are removed from contact with the gear teeth and the rollers rotate freely.

An advantage of the invention is that reliable fingerprint information is repeatedly acquired. The proper design of any one of the embodiments forces a user to properly position a finger to be imaged. The contour of the finger-support region and the raised bumps along that region provide tactile feedback for a user. Another advantage is that the locking mechanism reduces the likelihood of premature movement of the finger guide along its slide path. The user can adjust finger positioning prior to applying the pressure that releases the finger guide.

DETAILED DESCRIPTION

Figure 1:
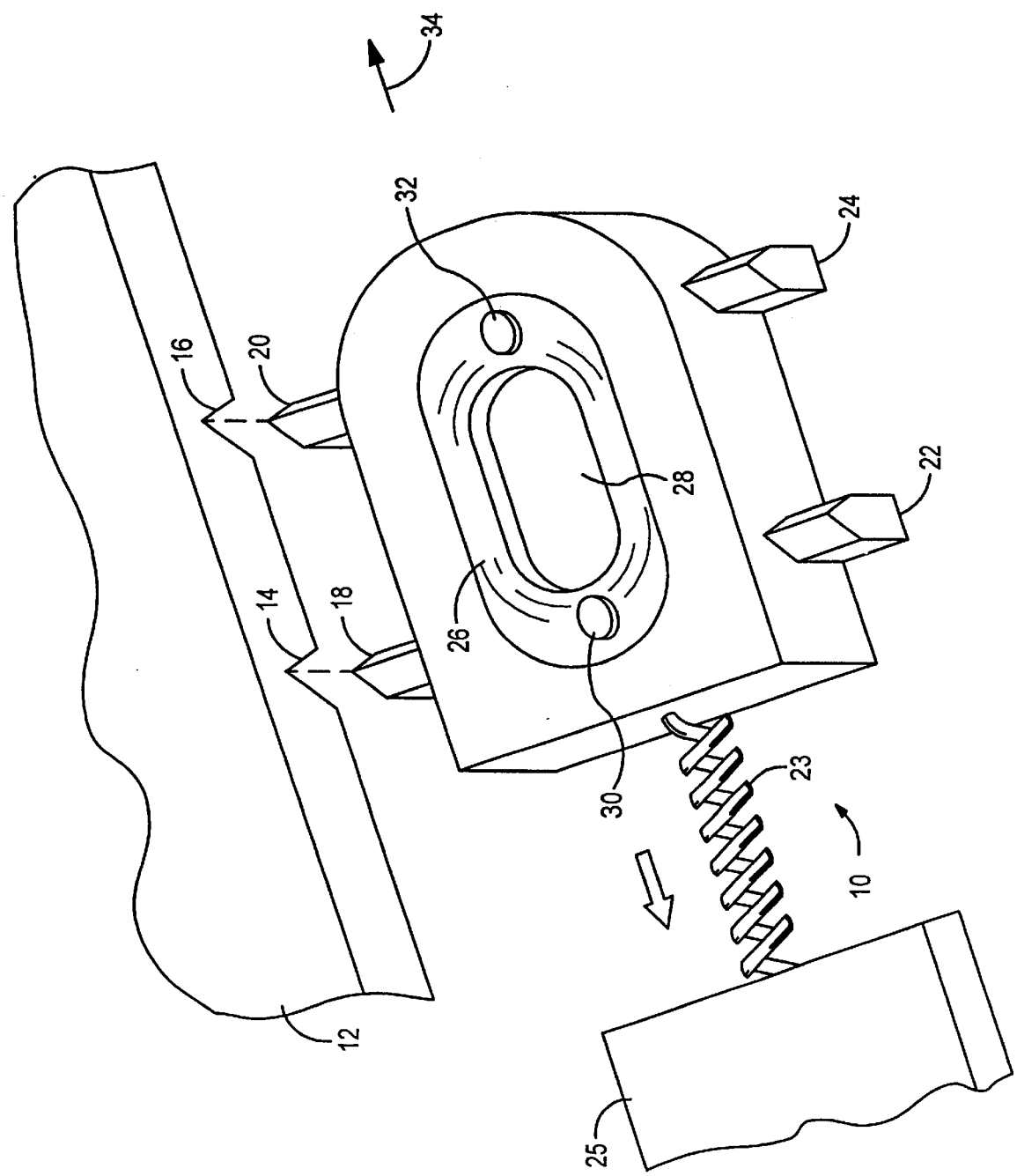
FIG. 1 is a perspective view of a sliding finger guide having a release condition and a lock condition that are determined by a detent-and-notch arrangement in accordance with one embodiment of the invention.

With reference to FIG. 1, a sliding finger guide 10 is shown as being positioned adjacent to a housing 12 having a pair of notches 14 and 16. The distance between the notches corresponds to the distance between a pair of detents 18 and 20 on one side of the guide 10. The upper portions of the detents have a configuration that corresponds to the dimensions of the notches, so that the detents easily rest within the notches. The finger guide 10 is in a rest position when the detents reside within the notches. A spring 23 is connected to a fixed region 25 of the housing 12 to bias the guide into the rest position. Preferably, there are third and fourth detents 22 and 24 that reside within third and fourth notches (not shown) when the guide is in the rest position.

The finger guide 10 also includes a finger-supporting region 26. Preferably, the region is concave, with a contour that is designed to comfortably receive a finger to be imaged. A central opening 28 exposes a sufficient portion of the finger to allow the identity of a person to be verified upon acquired fingerprint information.

The finger-supporting region 26 is shown as including a pair of raised bumps 30 and 32. The bump 30 will be described as being on a rearward side of the guide 10, since the guide moves in the direction indicated by arrow 34 when the system is in a fingerprint reading operation. The bump 32 is therefore identified as the forward bump. The function of the bumps is to provide tactile feedback for positioning of the finger relative to the central opening 28. Typically, there is an advantage to providing a generally parallel relationship between the finger and an imaging device (not shown) that is used to acquire the fingerprint information. By positioning the raised bumps 30 and 32 at the forward and rearward ends of the region 26 and by spacing the bumps sufficiently apart to ensure that an upright finger will not contact both bumps, the user is aided in determining when the finger has the desired orientation relative to an imaging plane and is aligned with the direction indicated by arrow 34.

In the operation of the system that includes the finger guide 10 and the housing 12 of FIG. 1, the detents 18, 20, 22 and 24 rest within corresponding notches 14 and 16 prior to contact of a finger with the finger-supporting region 26. If a finger is improperly positioned along the guide 10, the downward pressure applied by the finger may not unseat all of the detents from the notches. As a result, the guide will remain in its rest position. The preferred position of the finger is one in which both of the bumps 32 and 30 are contacted and the finger is pointed in the general direction of intended movement of the guide, i.e., the finger is pointed in the direction of arrow 34. In this desired position, downward pressure of the finger onto the guide 10 will unseat all of the detents from the corresponding notches and the guide will move in the direction of arrow 34. The arrow indicates the slide path that is followed in order to cause the central opening 28 to traverse an interrogation region of the imaging device. Following the reading process, the guide 10 is returned to the rest position by the force of the spring 23.

The finger guide 10 is biased upwardly by a spring mechanism (not shown) that supplies an upward bias to maintain the detents 18, 20, 22 and 24 within the notches 14 and 16 until finger pressure unseats the detents. Thus, the spring mechanism and the spring 23 cooperate to automatically return the guide to the rest position following a fingerprint reading operation. While the detents are shown as being formed on the guide 10 and the notches are shown as being formed on the housing 12, this is not critical. The system will operate in the same manner if the detents are on the housing and the notches are formed within the guide. Moreover, other arrangements for defining a rest position for the finger guide may be utilized.

Figure 2:
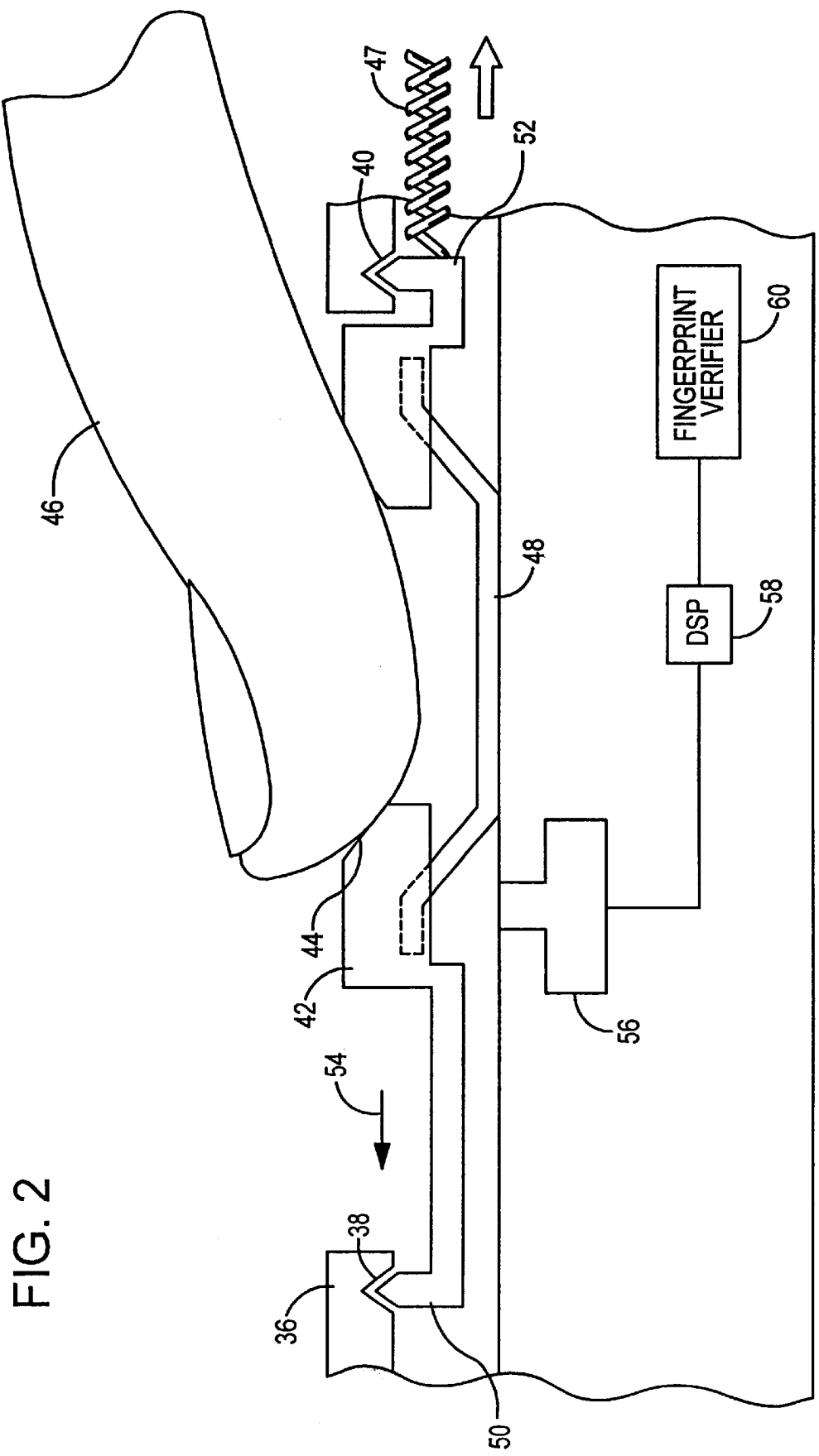
FIG. 2 is a side view of a fingerprint reader system having a detent-and-notch arrangement in accordance with a second embodiment of the invention.

Referring now to FIG. 2, another embodiment of a fingerprint reading system is shown. The device includes a housing 36 in which a pair of notches 38 and 40 are formed. A finger guide 42 having a finger-supporting region 44 is shown as being contacted by a finger 46. As will be readily understood by a person of ordinary skill in the art, the term "finger" as used herein includes a person's thumb. Thus, the finger 46 in FIG. 2 may be a thumb.

The guide 42 is shown in the rest position in FIG. 2. A spring 47 is connected to apply a rearward force, so that the guide is in the rest position when it is not in use. In this rest position, a spring member 48 biases the guide upwardly, with a pair of projections 50 and 52 extending into the notches 38 and 40. The structure of the spring member is not critical. The spring member can be a metallic or plastic leaf spring that easily returns to the condition shown in FIG. 2 after it is compressed. More than one spring member may be employed.

With the finger 46 properly positioned along the finger-supporting region 44, the finger is able to compress or deform the spring member 48 to remove the projections 50 and 52 from the notches 38 and 40. The guide 42 is then able to move in the direction indicated by arrow 54. While not shown in FIG. 2, the spring member 48 is configured to leave the fingerprint region of the finger 46 exposed to a camera 56 as the guide 42 moves in the direction of arrow 54. The type of camera used in the system of FIG. 2 is not critical to the invention. Any known device for acquiring fingerprint information may be used without diverging from the invention. Similarly, the circuitry 58 and the algorithm for performing digital signal processing (DSP) and the circuitry 60 for performing fingerprint verification are not critical to the invention.

In comparing the embodiments of FIGS. 1 and 2, the only significant difference is that the notch-and-detent arrangements of FIG. 1 are adjacent to the slide path of the guide 10, while the notch-and-detent arrangements of FIG. 2 are aligned with the slide path of the guide 42.

Figure 3:
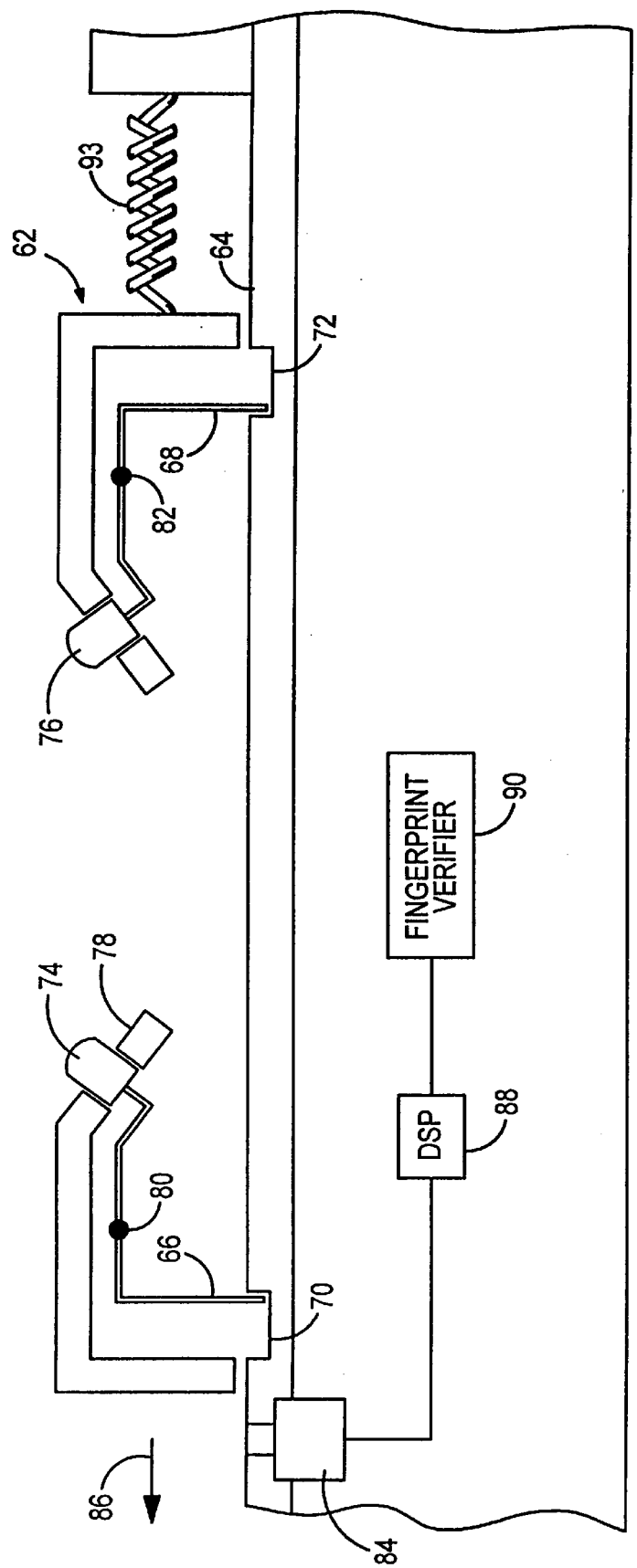
FIG. 3 is a side view of a fingerprint reader system in accordance with a third embodiment of the invention, with a finger guide being shown in a lock condition.

Referring now to FIG. 3, a third embodiment of a fingerprint reading system is shown as including a sliding finger carriage 62 resting atop a housing 64. The carriage 62 is in the rest position, since a pair of rods 66 and 68 extend into grooves 70 and 72 within the upper surface of the housing. A pair of actuators 74 and 76 extend above the surface of a finger-supporting region 78 of the carriage 62. As will be described more fully below, when the actuators 74 and 76 are depressed by proper positioning of a finger, the rods 66 and 68 are rotated about pivot axes 80 and 82 until the rods no longer reside within the grooves 70 and 72. In the rest position shown in FIG. 3, the sliding carriage 62 is adjacent to a camera 84. However, the release of the carriage by removing the rods 66 and 68 from the grooves 70 and 72 allows the carriage to move in the direction of a slide path indicated by arrow 86. As a result, the carriage moves over the field of view of the camera 84. The camera acquires fingerprint information that is used by DSP circuitry 88 and a fingerprint verifier 90. The operations of the camera, DSP circuitry and fingerprint verifier are not critical to the invention.

Similar to the embodiments of FIGS. 1 and 2, the carriage 62 is biased by a spring 91 into the rest position. While coil springs have been shown in the drawings, other types of biasing mechanisms may be substituted.

Figure 4:
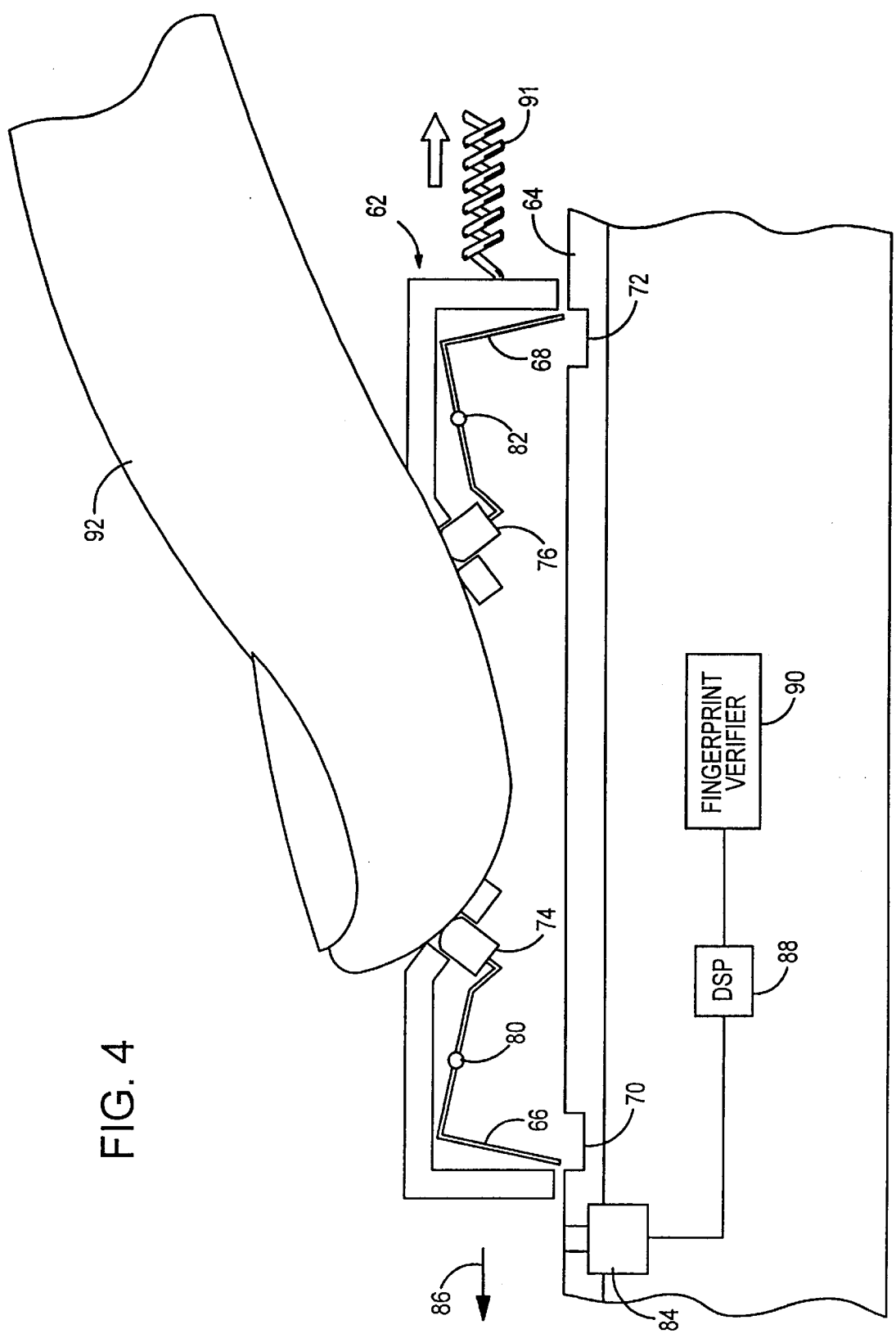
FIG. 4 is a side view of the system of FIG. 3 shown in a release condition.

Referring now to FIG. 4, the sliding carriage 62 is shown in the release condition. A finger 92 is aligned generally parallel to the imaging plane of the camera 84 and is directed in alignment with the direction of travel 86 of the carriage. The downward pressure of the finger 92 onto the actuators 74 and 76 causes rotation of the rods 66 and 68 about the pivot axes 80 and 82. This rotation removes the rods from the grooves 70 and 72 within the upper surface of the housing 64. Following the downward pressure of the finger, forward pressure that is applied by the finger will overcome the force of a spring 93 and will cause the carriage and finger to move across the field of view of the camera 84. The camera is focused to provide sufficient resolution for reliably identifying the fingerprint.

Figure 5:
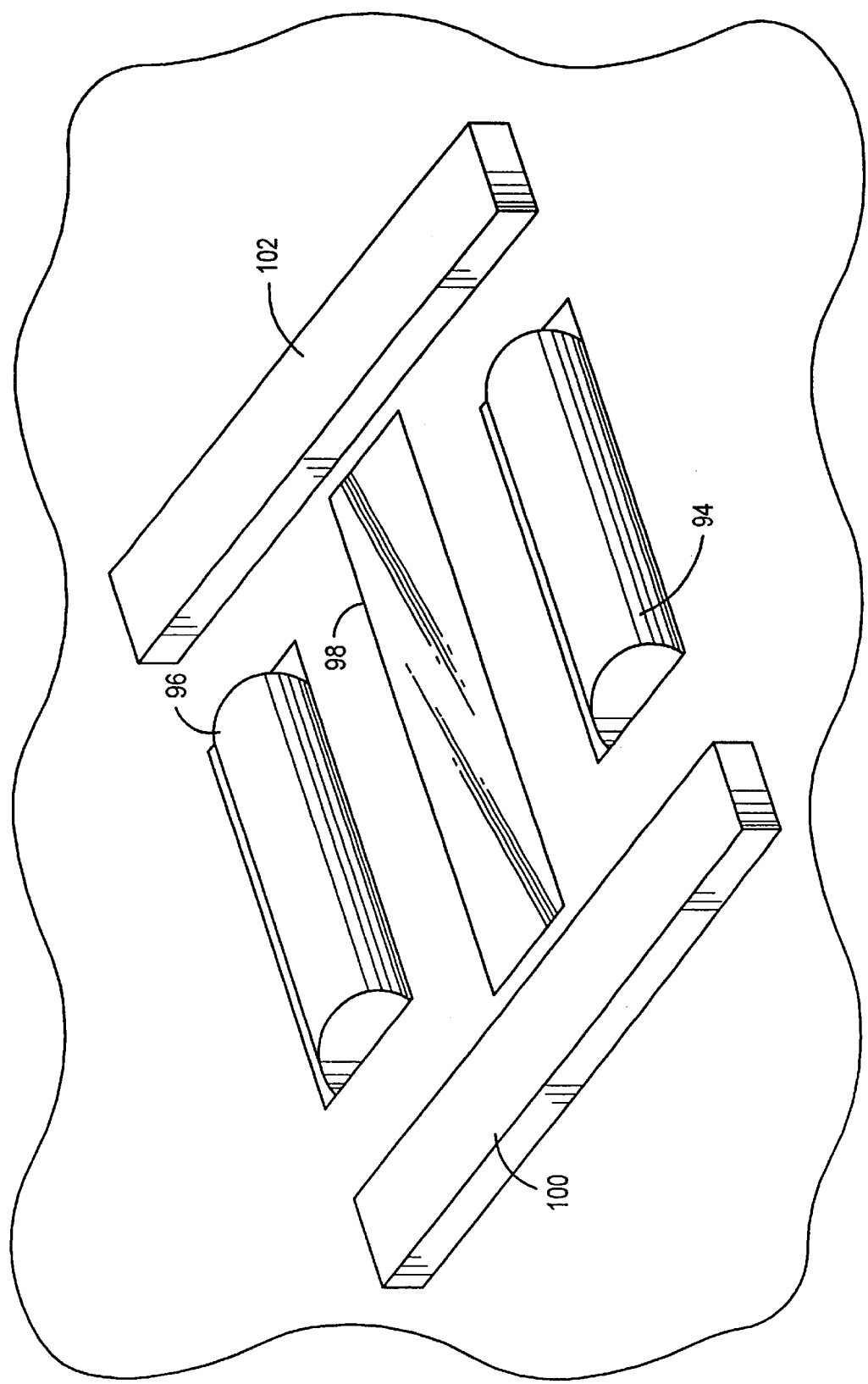
FIG. 5 is a perspective view of a fingerprint reader in accordance with another embodiment of the invention.

FIG. 5 is an embodiment of the invention that does not include a carriage. In this embodiment, the finger is supported by a pair of rollers 94 and 96 that are positioned on opposite sides of an imaging window 98. The rotational axes of the rollers are parallel to the length of the imaging window. This embodiment also includes a pair of release members 100 and 102 that determine whether the rollers are allowed to rotate about their axes. The release members are depressable actuators that operate with the rollers to promote proper finger placement during a fingerprint reading operation.

The rollers 94 and 96 and the release members 100 and 102 are sufficiently close to allow a finger to contact all four components. Thus, a properly positioned finger contacts both of the release members 100 and 102, so as to free rotation of the rollers 94 and 96 which determine the direction of movement of the finger over the imaging window 98. As the rollers are free to rotate only when both of the release members are depressed, and since the axes of rotation of the rollers are perpendicular to the desired movement of the finger relative to the imaging window, the finger must be substantially centered over the window and must be moved in the proper direction. Moreover, as will be described with reference to FIGS. 6 and 7, both ends of both of the release members must be depressed during a fingerprint reading operation.

Figure 6:
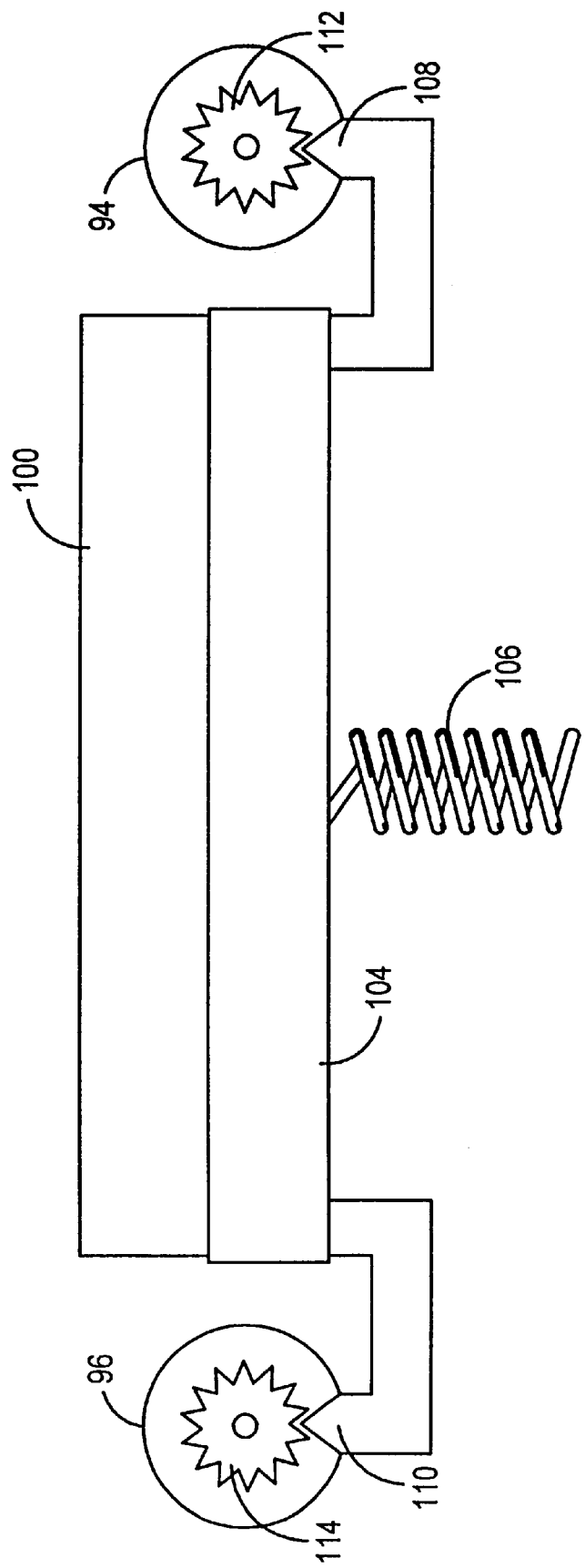
FIG. 6 is a side view of a release mechanism for the system of FIG. 5, with the release mechanism being shown in a lock condition.

FIG. 6 is a side view of the release mechanism 100 and the rollers 94 and 96. The release member is coupled to a stationary member 104 which may be part of the housing of the fingerprint reading system. A spring 106 biases the release member upwardly relative to the stationary member. While the spring is shown as being a coil spring, this is not critical. Alternatively, the spring may be a leaf spring or any other type of mechanism for biasing the release member 100.

Figure 7:
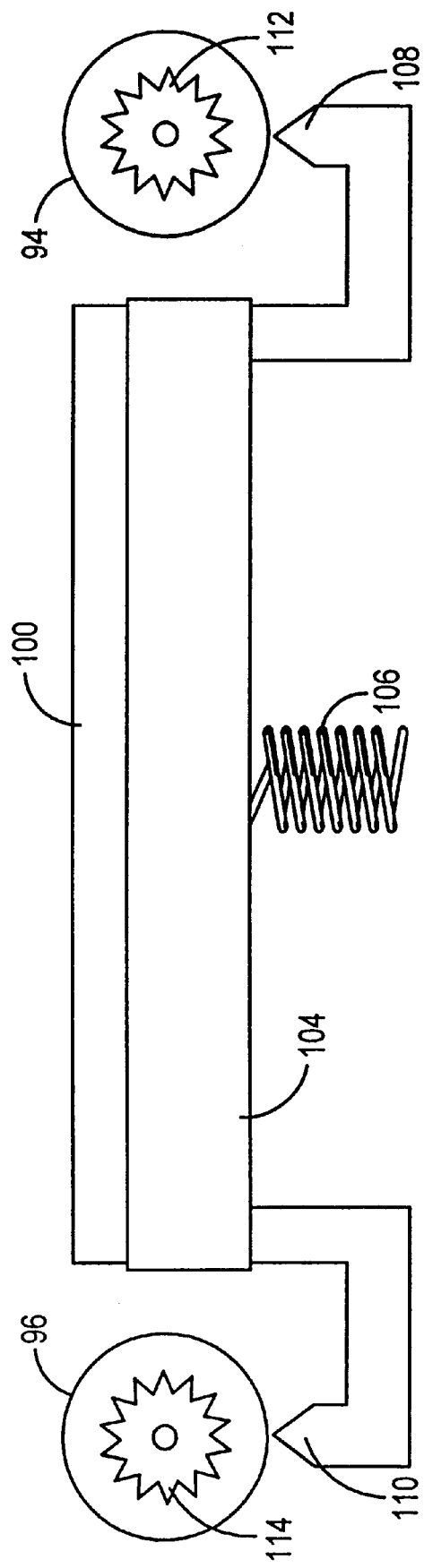
FIG. 7 is a side view of the release mechanism of FIG. 6, shown in a release condition.

In the lock condition shown in FIG. 6, the rollers 94 and 96 are prevented from rotating, since projections 108 and 110 extend into gear teeth of gears 112 and 114. The gears are fixed to the rollers 94 and 96. Referring now to FIG. 7, the release member 100 is shown as being depressed, so that the projections 108 and 110 are removed from the gear teeth, thereby freeing rotation of the rollers. In the preferred embodiment, the coupling of the release member 100 to the stationary member 104 allows the two ends of the release member to be moved separately. That is, the release member can pivot about its center. As a result, the projection 108 can move independently of the projection 110.

Referring to FIGS. 5, 6 and 7, the fingerprint reading operation requires the finger to contact both of the release members 100 and 102. Initially, only the near ends of the release members are contacted, so that only the first roller 94 is able to rotate. As the finger is moved in the direction of the second roller 96, the downward pressure of the finger on the release members frees the second roller. The user continues to move the finger across the imaging window 98 until sufficient fingerprint information is acquired. While not shown in FIG. 5, the fingerprint reading system includes a camera having a field of view aligned with the imaging window. The system also includes the necessary circuitry for processing the fingerprint information.

What is claimed is:

1. A system for imaging a fingerprint comprising:

a housing having a window that defines an interrogation region;

an imaging device having a field of view aligned with said window, said imaging device being connected to said housing;

at least one roller adjacent to said window to accommodate ease of movement of a subject finger along said window, each said roller having a portion that extends from said housing;

a locking means for selectively restricting rolling motion of said at least one roller; and a release member adjacent to said window to release said locking means in response to applied pressure, said release member being sufficiently close to said window and said at least one roller to enable said subject finger to simultaneously contact said release member, said window and each said roller.

2. The system of claim 1 wherein said at least one roller includes first and second rollers on opposite sides of said window.

3. The system of claim 1 wherein each said roller includes a gear having a plurality of circumferential teeth, said locking means including a projection aligned to extend into one of said teeth.

4. The system of claim 3 wherein said locking means includes a biasing member connected to bias projection into one of said teeth, said release member being cooperative with said biasing member to release said gear in response to applied pressure on said release member.

5. The system of claim 4 wherein said release member is a depressible button.

6. The system of claim 5 further comprising a second release member on a side of said window opposite to said depressible button.

* * * * *